US010432130B2

(12) United States Patent
Namuduri et al.

(10) Patent No.: US 10,432,130 B2
(45) Date of Patent: Oct. 1, 2019

(54) ELECTRIC POWERTRAIN AND A METHOD OF OPERATING THE SAME

(71) Applicant: GM GLOBAL TECHNOLOGY OPERATIONS LLC, Detroit, MI (US)

(72) Inventors: Chandra S. Namuduri, Troy, MI (US); Thomas W. Nehl, Shelby Township, MI (US); Lei Hao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/895,392

(22) Filed: Feb. 13, 2018

(65) Prior Publication Data

US 2019/0165713 A1    May 30, 2019

Related U.S. Application Data

(63) Continuation-in-part of application No. 15/824,525, filed on Nov. 28, 2017.

(51) Int. Cl.
| | |
|---|---|
| *H02P 27/06* | (2006.01) |
| *H02M 7/537* | (2006.01) |
| *H02M 1/08* | (2006.01) |
| *H02J 7/00* | (2006.01) |
| *B60L 50/51* | (2019.01) |

(52) U.S. Cl.
CPC ............. *H02P 27/06* (2013.01); *B60L 50/51* (2019.02); *H02J 7/0063* (2013.01); *H02M 1/08* (2013.01); *H02M 7/537* (2013.01); *B60L 2210/40* (2013.01)

(58) Field of Classification Search
CPC ..... H02P 27/06; H02J 7/0063; B60L 11/1803; B60L 2210/40; H02M 1/08; H02M 7/537

USPC ......................................................... 318/139
See application file for complete search history.

(56) References Cited

U.S. PATENT DOCUMENTS

| | | | | | |
|---|---|---|---|---|---|
| 4,019,106 | A | * | 4/1977 | Van Doren | ............... H02P 7/14 318/252 |
| 4,296,363 | A | * | 10/1981 | Blake | ..................... B63H 23/24 318/139 |
| 4,814,631 | A | * | 3/1989 | Jackson | .................. B60L 15/04 307/53 |

(Continued)

FOREIGN PATENT DOCUMENTS

| | | | |
|---|---|---|---|
| JP | 2007244102 A | * | 9/2007 |
| JP | 2010057288 A | * | 3/2010 |

OTHER PUBLICATIONS

Machine translation JP2010057288A.*
Machine translation JP2007244102A.*

*Primary Examiner* — Kawing Chan
(74) *Attorney, Agent, or Firm* — Quinn IP Law

(57) ABSTRACT

An electric powertrain includes an electric machine, an inverter connected to the electric machine, and an energy storage system for providing an electric current. The energy storage system includes a first energy storage device operable at a first device voltage, and a second energy storage device operable at a second device voltage. A plurality of low-loss switching devices interconnect the first energy storage device and the second energy storage device. The switching devices are selectively controllable between a first operating mode for providing the electric current at a first system voltage, and a second operating mode for providing the electric current at a second system voltage. The first system voltage is different from the second system voltage.

20 Claims, 7 Drawing Sheets

(56) References Cited

U.S. PATENT DOCUMENTS

| | | | | |
|---|---|---|---|---|
| 5,786,681 | A * | 7/1998 | Kalpathi | H02P 25/0925 318/254.2 |
| 6,166,500 | A * | 12/2000 | Makaran | H02M 1/34 318/400.22 |
| 7,489,048 | B2 * | 2/2009 | King | H02J 7/0024 307/10.1 |
| 9,024,586 | B2 * | 5/2015 | Vance | B60L 3/0046 320/122 |
| 2011/0043143 | A1 * | 2/2011 | Alter | H02P 4/00 318/3 |
| 2013/0110337 | A1 * | 5/2013 | Kondoh | H02J 7/34 701/22 |
| 2014/0195092 | A1 * | 7/2014 | Saito | B60W 10/02 701/22 |
| 2014/0354060 | A1 * | 12/2014 | Lee | H02J 1/00 307/71 |
| 2015/0134231 | A1 * | 5/2015 | Li | F02N 11/0814 701/112 |
| 2015/0207345 | A1 * | 7/2015 | Greening | H02J 7/0016 320/118 |
| 2016/0009194 | A1 * | 1/2016 | Katayama | B60L 58/14 320/109 |
| 2016/0079751 | A1 * | 3/2016 | Ide | H02J 7/0054 307/52 |
| 2016/0090054 | A1 * | 3/2016 | Powell | B60H 1/3232 307/9.1 |
| 2016/0129796 | A1 * | 5/2016 | Tomura | B60K 6/445 701/22 |
| 2017/0002744 | A1 * | 1/2017 | Poumarede | F02C 7/26 |
| 2017/0279275 | A1 * | 9/2017 | Yamamoto | H02J 7/35 |
| 2019/0126761 | A1 | 5/2019 | Verbridge | |

\* cited by examiner

ELECTRIC POWERTRAIN AND A METHOD OF OPERATING THE SAME

CROSS-REFERENCE TO RELATED APPLICATIONS

This application is a continuation in part of U.S. patent application Ser. No. 15/824,525, filed on Nov. 28, 2017, the disclosure of which is hereby incorporated by reference.

INTRODUCTION

The disclosure generally relates to an electric powertrain.

An electric powertrain includes an electric machine, such as but not limited to, an electric motor, and an energy storage system, such as but not limited to, a battery. The electric machine uses electric energy from the energy storage system to generate torque and provide a rotational output. The rotational output from the electric machine may be used to power a device. For example, the rotational output from the electric machine may provide motive power for a vehicle.

The torque producing ability of the electric powertrain at high rotational speeds of the electric machine is limited by the voltage output from the energy storage system. Torque output at higher rotational speeds may be increased with a higher voltage output from the energy storage system. However, the higher voltage output from the energy storage system generates higher energy losses in the electric powertrain at lower rotational speeds of the electric device.

SUMMARY

An electric powertrain is provided. The electric powertrain includes an electric machine, an inverter connected to the electric machine, and an energy storage system. The energy storage system is connected to the inverter for supplying an electric current to the inverter, which in turn supplies the electric current to the electric machine. The energy storage system includes a first energy storage device operable at a first device voltage, and a second energy storage device operable at a second device voltage. A plurality of switching devices interconnect the first energy storage device and the second energy storage device. The plurality of switching devices is selectively controllable between a first operating mode and a second operating mode. When the plurality of switching devices is controlled to operate in the first operating mode, the energy storage system is operable to provide the electric current at a first system voltage. When the plurality of switching devices is controlled to operate in the second operating mode, the energy storage system is operable to provide the electric current at a second system voltage. The first system voltage is different from the second system voltage.

In one aspect of the electric powertrain, the plurality of switching devices includes a first switching device, a second switching device, and a third switching device. The first switching device is selectively controllable between an on-state enabling electrical communication therethrough, and an off-state preventing electrical communication therethrough. The second switching device is selectively controllable between an on-state enabling electrical communication therethrough, and an off-state preventing electrical communication therethrough. Similarly, the third switching device is selectively controllable between an on-state enabling electrical communication therethrough, and an off-state preventing electrical communication therethrough.

In one aspect of the electric powertrain, the third switching device includes a bi-directional blocking switch. In one embodiment of the electric powertrain, the first switching device and the second switching device each include a uni-directional blocking switch. In this embodiment, the first device voltage and the second device voltage are substantially equal. When the plurality of switching devices is controlled to operate in the first operating mode, the first switching device and the second switching device are each disposed in their respective off-state and the third switching device is disposed in its respective on-state to connect the first energy storage device and the second energy storage device in a series electric circuit. The first system voltage is substantially equal to the sum of the first device voltage and the second device voltage. When the plurality of switching devices is controlled to operate in the second operating mode, the first switching device and the second switching device are each disposed in their respective on-state and the third switching device is disposed in its respective off-state to connect the first energy storage device and the second energy storage device in a parallel electric circuit. The second system voltage is substantially equal to the first device voltage and/or the second device voltage.

In another embodiment of the electric powertrain, the third switching device includes a bi-directional blocking switch, and the first switching device and the second switching device each include a bi-directional blocking switch. In this embodiment, the first device voltage may be different from the second device voltage. When the plurality of switching devices is controlled to operate in the first operating mode, the first switching device is disposed in its respective on-state and the second switching device and the third switching device are each disposed in their respective off state to isolate the second energy storage device, such that only the first energy storage device supplies the electric current at the first system voltage to the inverter. The first system voltage is substantially equal to the first device voltage. When the plurality of switching devices is controlled to operate in the second operating mode, the second switching device is disposed in its respective on-state and the first switching device and the third switching device are each disposed in their respective off state to isolate the first energy storage device, such that only the second energy storage device supplies the electric current at the second system voltage to the inverter. The second system voltage being substantially equal to the second device voltage. In this embodiment, the plurality of switching devices is selectively controllable to operate in a third operating mode to provide the electric current at a third system voltage. When the plurality of switching devices is controlled to operate in the third operating mode, the third switching device is disposed in its respective on-state and the first switching device and the second switching device are each disposed in their respective off-state to connect the first energy storage device and the second energy storage device in a series electric circuit to provide the electric current at the third system voltage. The third system voltage is substantially equal to the sum of the first device voltage and the second device voltage.

In one aspect of the electric powertrain, the electric machine is a three phase alternating current motor, and the inverter is a three phase inverter. In another aspect of the electric powertrain, a capacitor is disposed in a parallel electric circuit with the energy storage system and with the inverter.

In another aspect of the electric powertrain, the first energy storage device, the second energy storage device, and the plurality of switching devices are all integrated into a single pack.

A method of controlling an electric powertrain is also provided. The electric powertrain includes an electric machine, an inverter connected to the electric machine, and an energy storage system connected to the inverter. The method includes providing the energy storage system to include a first energy storage device operable at a first device voltage and a second energy storage device operable at a second device voltage. The energy storage system further includes a first switching device, a second switching device, and a third switching device. The first switching device is selectively controllable between an on-state enabling electrical communication therethrough, and an off-state preventing electrical communication therethrough. The second switching device is selectively controllable between an on-state enabling electrical communication therethrough, and an off-state preventing electrical communication therethrough. The third switching device is selectively controllable between an on-state enabling electrical communication therethrough, and an off-state preventing electrical communication therethrough. The method further includes controlling the first switching device, the second switching device, and the third switching device to operate in a first operating mode to provide an electric current at a first system voltage, when the electric machine is operating at a rotational speed that is less than a first defined threshold. The first switching device, the second switching device, and the third switching device are controlled to operate in a second operating mode to provide the electric current at a second system voltage when the electric machine is operating at a rotational speed that is equal to or greater than the first defined threshold.

In one embodiment of the method of controlling the electric powertrain, the first switching device and the second switching device are each uni-directional blocking switches and the third switching device is a bi-directional blocking switch. In this embodiment, the first device voltage and the second device voltage are substantially equal. The step of controlling the first switching device, the second switching device, and the third switching device to operate in the first operating mode includes controlling the first switching device and the second switching device into their respective off-state and the third switching device into its respective on-state to connect the first energy storage device and the second energy storage device in a series electric circuit. The first system voltage is substantially equal to the sum of the first device voltage and the second device voltage. The step of controlling the first switching device, the second switching device, and the third switching device to operate in the second operating mode includes controlling the first switching device and the second switching device into their respective on-state and the third switching device into its respective off-state to connect the first energy storage device and the second energy storage device in a parallel electric circuit. The second system voltage is substantially equal to the first device voltage and the second device voltage.

In another embodiment of controlling the electric powertrain, the first switching device, the second switching device, and the third switching device are each a bi-directional blocking switch. In this embodiment, the first device voltage and the second device voltage are different. The step of controlling the first switching device, the second switching device, and the third switching device to operate in the first operating mode includes controlling the first switching device into its respective on-state and the second switching device and the third switching device into their respective off-state to isolate the second energy storage device, such that only the first energy storage device supplies the electric current at the first system voltage. The first system voltage is substantially equal to the first device voltage. The step of controlling the first switching device, the second switching device, and the third switching device to operate in the second operating mode includes controlling the second switching device into its respective on-state and the first switching device and the third switching device into their respective off-state to isolate the first energy storage device, such that only the second energy storage device supplies the electric current at the second system voltage. The second system voltage is substantially equal to the second device voltage. The method further includes controlling the first switching device, the second switching device, and the third switching device to operate in a third operating mode to provide an electric current at a third system voltage when the electric machine is operating at a rotational speed that is greater than a second defined threshold. The step of controlling the first switching device, the second switching device, and the third switching device to operate in the third operating mode includes controlling the third switching device into its respective on-state and the first switching device and the second switching device into their respective off-state to connect the first energy storage device and the second energy storage device in a series electric circuit to provide the electric current at the third system voltage. The third system voltage is substantially equal to the sum of the first device voltage and the second device voltage.

Accordingly, the energy storage system is capable of providing the electric current to the inverter at different voltages, e.g., a lower voltage and a higher voltage. The energy storage system may be controlled to provide the electric current at the lower voltage when the electric machine is operating at a lower rotational speed in order to reduce energy losses in the system. The energy storage system may be controlled to provide the electric current at the higher voltage when the electric machine is operating at higher rotational speeds to enable the electric machine to generate more torque.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
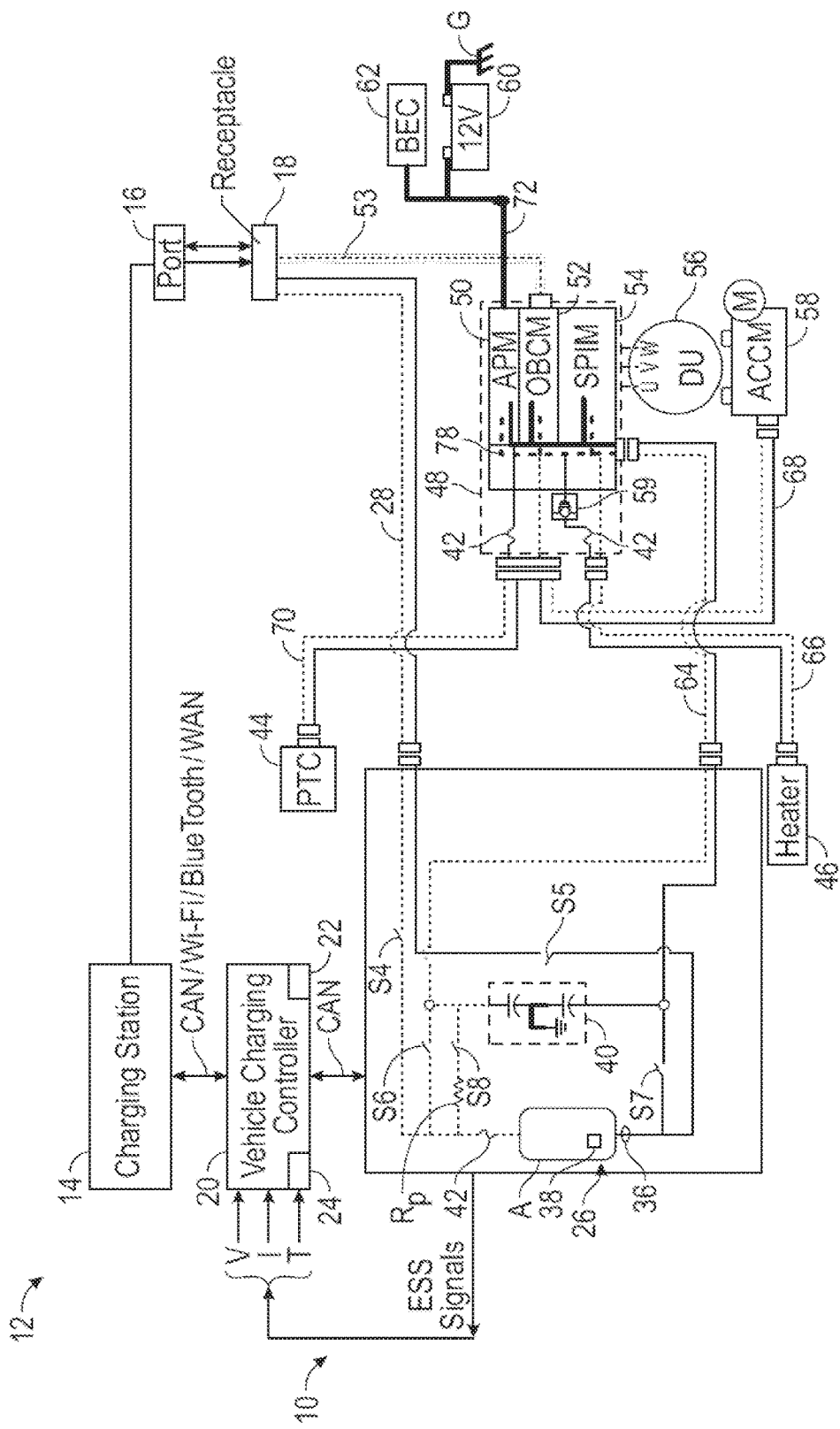
FIG. 1 is a schematic diagram of an apparatus for flexible DC fast charging of an electrified vehicle.
Figure 2:
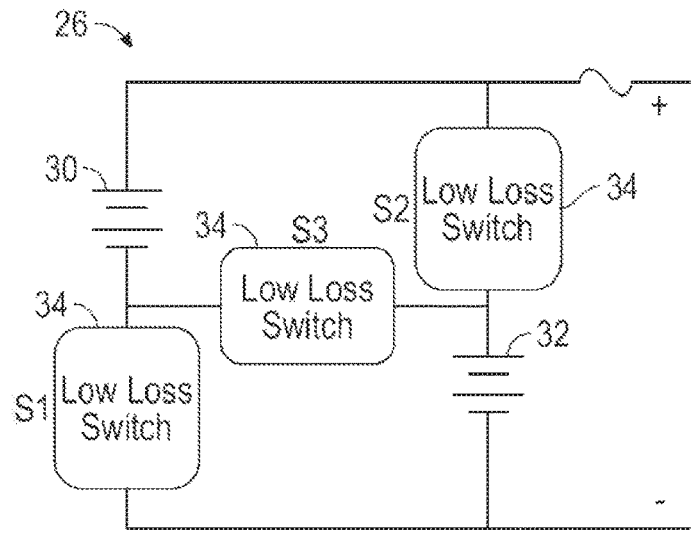
FIG. 2 is a schematic diagram of a part of the reconfigurable energy storage system of the apparatus of FIG. 1, taken around area A of FIG. 1, wherein the reconfigurable energy storage system includes a first rechargeable energy storage device, a second rechargeable energy storage device, and a plurality of low-loss switching devices.

With reference to FIGS. 1 and 2, the present disclosure describes an apparatus 10 for flexible DC fast charging of an electrified vehicle 12. The apparatus 10 is part of the electrified vehicle 12, which may be a hybrid vehicle or a plug-in electric vehicle. By employing the apparatus 10, the charging time of the electrified vehicle 12 can be minimized when connected to a high power direct current (DC) fast charging station 14. The voltage of the high-power DC fast charging station 14 may be 800 volts. The charging station 14 includes a charge port 16 capable of supplying a DC voltage or an alternating current (AC) voltage or both. The apparatus 10 includes a charge receptacle 18 configured to receive the charge port 16 to electrically charge the electrified vehicle 12. The charge receptacle 18 can therefore receive AC voltage and/or DC voltage. In addition, the charge receptacle 18 may be configured to communicate with the charge station 14 through the charge port 16. As such, the charge receptacle 18 may receive and send communication and port verification signals from the charge port 16.

The electrified vehicle 12 includes a vehicle charging controller 20 to establish a wireless and/or wired communication link with the charging station 14. A communication network (such as CAN, WAN, Blue-Tooth, Wi-Fi), can establish the wireless and/or wired communication between the charging station 14 and the vehicle charging controller 20. As a result, the vehicle charging controller 20 can communicate wirelessly and/or via wire with the vehicle charging station 14. The electrified vehicle 12 may also include a Global Positioning System (GPS) to determine the location of the electrified vehicle 12 with respect to the charging station 14. The vehicle charging controller 20 includes a processor 22 and a non-transitory memory 24 in communication with the processor 22. The non-transitory memory 24 can store instructions that can be executed by the processor 22. The vehicle charging controller 20 is programmed to determine the charging voltage of the charging station 14 based on the communication signal received from the charging station 14. This communication signal is indicative of the charging voltage of the charging station 14. The charging voltage may be, for example, a low voltage (e.g., 400 Volts) or a high voltage (e.g., 800 volts). In the present disclosure, the low voltage is referred to as the first voltage, and the high voltage is referred to as the second voltage. The high voltage (i.e., the second voltage) is greater than the first voltage (i.e., low voltage). The vehicle charging controller 20 can also send current requests to the charging station 14 to electrically charge the electrified vehicle 12. The apparatus 10 includes a reconfigurable energy storage system 26 selectively and electrically connected to the charge receptacle 18 via a first DC wiring 28.

With specific reference to FIG. 2, the reconfigurable energy storage system 26 includes a first rechargeable energy storage device 30 and a second rechargeable energy storage device 32. In the present disclosure, the term "rechargeable energy storage device" refers to devices that are rechargeable and capable of storing electrical energy, such as ultra-capacitors, batteries, battery packs, battery cells, or a combination thereof. Each of the first rechargeable energy storage device 30 and the second rechargeable energy storage device 32 is selectively and electrically connected to the charge receptacle 18 (FIG. 1). The reconfigurable energy storage system 26 further includes a plurality of low-loss switching devices 34 selectively connected to the first rechargeable energy storage device 30 and the second rechargeable energy storage device 32. Each of the plurality of low-loss switching devices 34 is in communication with the vehicle charging controller 20. As a result, the vehicle charging controller 20 can control the operation of the low-loss switching devices 34. In the present disclosure, the term "low-loss switching device" means a solid state relay and/or an electromechanical relay. A solid state relay has no moving parts but instead uses the electrical and optical properties of solid state semiconductors to perform its input to output isolation and switching functions. As non-limiting examples, solid state relays include MOS-controlled Thyristors (MCTs), gallium-nitride (GaN) field-effect transistors (FETs), metal-oxide-semiconductor field-effect transistors (MOSFETs), silicon carbide junction field-effect transistors (SiC JFETs), insulated-gate bipolar transistors (IGBTs) or other suitable low-loss device of suitable voltage and current ratings. The low-loss switching devices 34 may be electromechanical relays in parallel with solid state switches to further reduce the on-state conduction loses. During operation, the solid state switches carry the current during switching from on-to-off or off-to-on state of the electromechanical relay to eliminate arcing. The term "low-loss switching device" does not include strictly mechanical switches, because it is desirable to minimize the risk of the mechanical contacts from welding together. The low-loss switching devices 34 are optimized for low voltage drop and eliminate arcing during switching. The vehicle charging controller 20 is programmed to selectively actuate the plurality of low-loss switching devices 34 based on the charging voltage of the charging station 14 such that a nominal voltage (Vbatt) of the reconfigurable energy storage system 26 matches the charging voltage of the charging station 14.

In the depicted embodiment, the low-loss switching devices 34 include a first low-loss switching device S1, a second low-loss switching device S2, and a third low-loss switching device S3. Each of the first low-loss switching device S1, the second low-loss switching device S2, and the third low-loss switching device S3 is selectively connected to the first rechargeable energy storage device 30 and the second rechargeable energy storage device 32. Each of the first low-loss switching device S1, the second low-loss switching device S2, and the third low-loss switching device S3 is in communication with the vehicle charging controller 20. Each of the first low-loss switching device S1, the second low-loss switching device S2, and the third low-loss switching device S3 has an on-state and an off-state.

Figure 3:
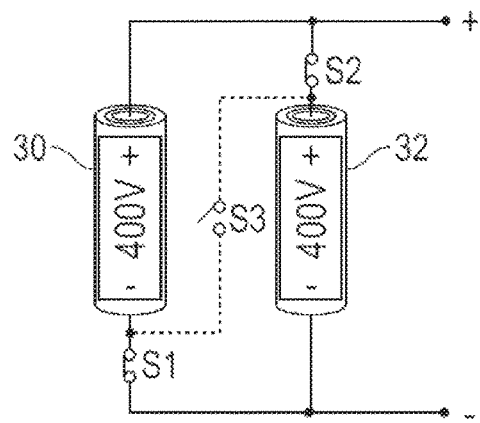
FIG. 3 is a schematic diagram of the reconfigurable energy storage system of FIG. 2, showing the first rechargeable energy storage device and the second rechargeable energy storage device electrically connected in parallel.

With reference to FIGS. 2 and 3, the vehicle charging controller 20 is programmed to determine that the charging voltage of the charging station 14 is the first voltage (i.e., the first voltage, which may be 400 Volts). In response to determining that the charging voltage of the charging station 14 is the low voltage (e.g., 400 Volts), the vehicle charging controller 20 is programmed to command the first low-loss switching device S1 and the second low-loss switching device S2 to be in the on-state and to command the third low-loss switching device S3 to be in the off-state, thereby electrically connecting the first rechargeable energy storage device 30 and the second rechargeable energy storage device 32 in parallel. Because the first rechargeable energy storage device 30 and the second rechargeable energy storage device 32 are electrically connected in parallel, the nominal voltage of the reconfigurable energy storage system 26 matches the charging voltage of the charging station 14, thereby allowing the normal charging operation of the electrified vehicle 12 without compromising the electrical components of the apparatus 10, which are designed for the low voltage (e.g., 400 Volts).

Figure 4:
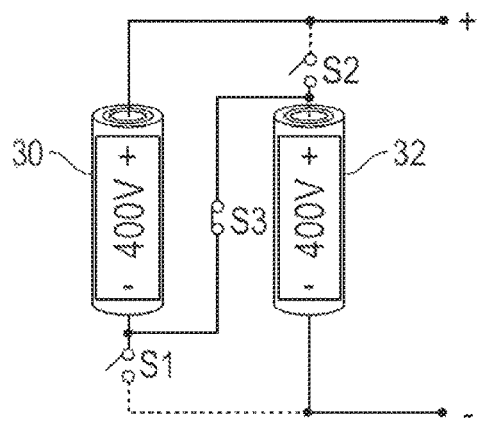
FIG. 4 is a schematic diagram of the reconfigurable energy storage system of FIG. 2, showing the first rechargeable energy storage device and the second rechargeable energy storage device electrically connected in series.

With reference to FIGS. 2 and 4, the vehicle charging controller 20 is programmed to determine that the charging voltage of the charging station 14 is the high voltage (e.g., the second voltage, which may be 800 volts). The vehicle charging controller 20 is programmed to command the first low-loss switching device S1 and the second low-loss switching device S2 to be in the off-state and to command the third low-loss switching device S3 to be in the on-state, thereby electrically connecting the first rechargeable energy storage device 30 and the second rechargeable energy storage device 32 in series in response to determining that the charging voltage of the charging station 14 is the second voltage (e.g., the second voltage, which may be 800 volts). Because the first rechargeable energy storage device 30 and the second rechargeable energy storage device 32 are electrically connected in series, the nominal voltage of the reconfigurable energy storage system 26 matches the higher charging voltage of the charging station 14 (e.g., 800 volts), thereby allowing the fast DC charging of the electrified vehicle 12 at a higher power without compromising the electrical components of the apparatus 10, which are designed for a specific current rating (e.g., 400A). Thus, the first rechargeable energy storage device 30 and the second rechargeable energy storage device 32 are identical and can be connected in parallel for normal charging or in series for fast DC charging of the electrified vehicle 12. Further, if and solely if the voltage of the charging station 14 is 400 Volts, but the nominal voltage of the reconfigurable energy storage system 26 is 800 volts, the vehicle charging controller 20 selectively actuates the first low-loss switching device S1, the second low-loss switching device S2, and the third low-loss switching device S3 to match voltage of the reconfigurable energy storage system 26 to that of the charging station 14. Also, if and solely if the voltage of the charging station 14 is 800 volts, the vehicle charging controller 20 selectively actuates the first low-loss switching device S1, the second low-loss switching device S2, and the third low-loss switching device S3 to match voltage of the reconfigurable energy storage system 26 to that of the charging station 14.

Figure 5:
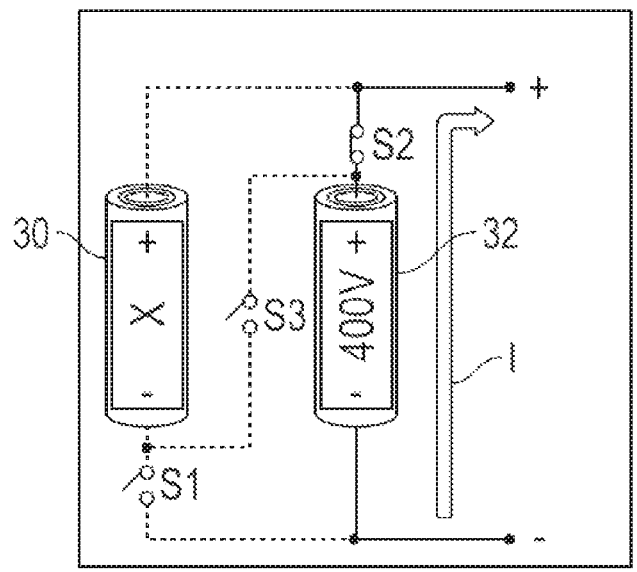
FIG. 5 is a schematic diagram of the reconfigurable energy storage system, showing electricity flowing through the second rechargeable energy storage device and bypassing the second rechargeable energy storage device.

With reference to FIGS. 2 and 5, the vehicle charging controller 20 is programmed to determine whether the first rechargeable energy storage device 30 is faulty. In the present disclosure, the term "faulty" means that an energy storage device cannot be recharged, that the energy storage device 30 cannot supply voltage, that the temperature of the energy storage device 30 is above a predetermined upper threshold, that the temperature of the energy storage device 30 is below a predetermined lower threshold, or another condition that prevents the energy storage device 30 from functioning as intended. In response to determining that the first rechargeable energy storage device 30 is faulty, the vehicle charging controller 20 is programmed to command the first low-loss switching device S1 and the third low-loss switching device S3 to be in the off-state and to command the second low-loss switching device S2 to be in the on-state to bypass the first rechargeable energy storage device 30, which is faulty. As a consequence, the electrical current I passes through the second rechargeable energy storage device 32 but bypasses the first rechargeable energy storage device 30.

With reference to FIG. 2, the vehicle charging controller 20 is programmed to determine that the second rechargeable energy storage device 32 is faulty. In response to determining that the second rechargeable energy storage device 32 is faulty, the vehicle charging controller 20 is programmed to command the second low-loss switching device S2 and the third low-loss switching device S3 to be in the off-state and to command the first low-loss switching device S1 to be in the on-state to bypass the second rechargeable energy storage device 32, which is faulty. Thus, the electrical current I passes through the first rechargeable energy storage device 30 but bypasses the second rechargeable energy storage device 32.

With reference again to FIG. 1, the reconfigurable energy storage system 26 is in communication (e.g., electronic communication) with the vehicle charging controller 20. A controller area network (CAN) can establish the wired or wireless communication between the reconfigurable energy storage system 26 and the vehicle charging controller 20. Thus, the reconfigurable energy storage system 26 can send energy storage system (ESS) signals to the vehicle charging controller 20. For example, the ESS signals may include signals indicative of the temperature T, the voltage V, and the current I of the reconfigurable energy storage system 26. The reconfigurable energy storage system 26 may include a current sensor 36 configured to measure the current I of the reconfigurable energy storage system 26. The reconfigurable energy storage system 26 may include a temperature sensor 38 configured to measure the temperature T of the reconfigurable energy storage system 26. The reconfigurable energy storage system 26 may include a Y-capacitor 40 to minimize electromagnetic noise. The reconfigurable energy storage system 26 may also include a fuse 42 for protection. The reconfigurable energy storage system 26 may also include additional switching devices S4, S5, S6, S7, and S8. The switching devices S4 and S5 selectively and electrically connects the charge receptacle 18 to the reconfigurable energy storage system 26. Thus, the switching devices S4 and S5 are selectively and electrically connected to the first DC wiring 28. The reconfigurable energy storage system 26 also includes a pre-charge circuit, which includes a resistor Rp and a switching device S8. Before DC Fast charging the electrified vehicle 12, the switching devices S6, S7 and S8 are in the off-state, thereby preventing inverse current from the first rechargeable energy storage device 30 and the second rechargeable energy storage device 32 to an onboard charging module (OBCM) 52. The OBCM 52 converts the AC power from the charge port receptacle 18 via wires 53 to DC power at its output which is connected to the propulsion system DC Power Bus 78 inside the Power Electronics Bay (PEB) 48.

The apparatus 10 includes a positive temperature coefficient (PTC) heating element 44 for heating the passenger cabin of the vehicle 12. The apparatus 10 further includes a heater 46 for heating the reconfigurable energy storage system 26. Further, the apparatus 10 includes a power electronics bay (PEB) 48 with internal propulsion system DC Power Bus 78. The PEB 48 includes an auxiliary power module (APM) 50 for providing power to the vehicle accessories, such as the radio. The input of the APM 50 is connected to the propulsion system DC Power Bus 78. The output of the APM 50 is electrically connected to a 12-volt battery 60, which is grounded via the ground G. The output of the APM 50 is also electrically connected to the bussed electrical center (BEC) 62, which can distribute power to the vehicle accessories. The input of the APM 50 or the propulsion system DC Power Bus 78 can be supported by the AC charging port 16 via the OBCM 52, which maintains the nominal 400V bus voltage on the propulsion system DC Power Bus 78 for the APM 50 and the air conditioning control module (ACCM) 58 if a higher voltage (i.e., 800 volts) charging is used. The PEB 48 also includes the OBCM 52, which is capable of receiving AC voltage from the charging station 14 via the charge receptacle 18. Accordingly, an AC wiring 53 electrically interconnects the charge receptacle 18 and the OBCM 52. The PEB 48 also includes a single power inverter module (SPIM) 54 for changing DC current to 3-phase or multi-phase AC current. The PEB 48 also includes a switching device 59 between the propulsion system DC Power Bus 78 and the heater 46. The PEB 48 also includes a fuse 42 between the PTC heating element 44 and the propulsion system DC Power Bus 78 for protection. In addition, another fuse 42 may be electrically connected between the switching device 59 and the heater 46 for protection. Before charging, it is desirable to heat the reconfigurable energy storage system 26 to facilitate charging the first rechargeable energy storage device 30 and the second rechargeable energy storage device 32. The vehicle charging controller 20 can therefore control the switching device 59 to supply electrical energy to the heater 46 from the propulsion system DC Power Bus 78.

The SPIM 54 is electrically connected to the drive unit 56 through the terminals U, V, W. The drive unit 56 includes gears and an electric motor to propel the electrified vehicle 12. The propulsion system DC Power Bus 78 is electrically connected to the ACCM 58, which is configured to control the air conditioning of the passenger cabin of the vehicle 12. The ACCM 58 supplies an electric machine M that drives the air-conditioning compressor.

During normal charging, switching devices S4 and S5 are on the off-state, switching devices S6 and S7 are on the on-state, and charging current is supplied to the first rechargeable energy storage device 30 and the second rechargeable energy storage device 32 through the AC wiring 53 and the OBCM 52. During 400V DC fast charging, switching devices S4, S5, S6 and S7 are on the on-state, and the current flows from the charge receptacle 18, through the first DC wiring 28, and to the first rechargeable energy storage device 30 and the second rechargeable energy storage device 32. A second DC wiring 64 electrically interconnects the PEB 48 and the reconfigurable energy storage system 26. In case of 800V DC Fast Charging, the OBCM 52 can be active and switching devices S6, S7 and S8 are in the off-state. The input to APM 50 via propulsion system DC Power Bus 78 can be supplied via the OBCM 52, which maintains the nominal 400 Volts bus voltage for the APM 50 and the ACCM 58 if the 800V fast DC charging is employed. A third DC wiring 66 electrically interconnects the heater 46 and the output of the switching device 59 in the PEB 48. A fourth DC wiring 68 electrically interconnects the ACCM 58 and the propulsion system DC Power Bus 78. A fifth DC wiring 70 electrically interconnects the propulsion system DC Power Bus 78 and the PTC heating element 44. A bus 72 electrically connects the output of the APM 50 to the BEC 62 and the 12-volt battery 60. The energy storage system 26 is coupled to the SPIM 54 through switching devices S6, S7 and the pre-charge circuit (i.e., switching device S8 and resistor Rp) via second DC wiring 64.

Figure 6:
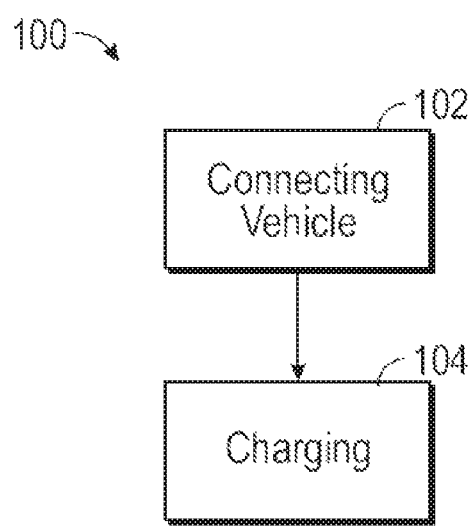
FIG. 6 is a flowchart of a method for flexible DC fast charging of an electrified vehicle.

FIG. 6 is a flowchart of a method 100 for flexible DC fast charging of the electrified vehicle 12. The method 100 begins at step 102, which entails providing the electrified vehicle 12. In addition, step 102 entails electrically connecting the electrified vehicle 12 to the charging station 14 to electrically charge the electrified vehicle 12. Then, the method 100 proceeds to step 104. At step 104, the vehicle charging controller 20 commands the low-loss switching devices 34 to selectively actuate based on the charging voltage of the charging station 14 as discussed above. Specifically, the vehicle charging controller 20 commands the low-loss switching devices 34 to selectively actuate such that a nominal voltage of the reconfigurable energy storage system 26 matches the charging voltage of the charging station 14 after the charge receptacle 18 is electrically connected to the charge port 16 of the charging station 14. In this step, the vehicle charging controller 20 then commands the low-loss switching devices 34 to selectively actuate to electrically connect the first rechargeable energy storage device 30 and the second rechargeable energy storage device 32 in series or in parallel such that the nominal voltage of the reconfigurable energy storage system 26 matches the charging voltage of the charging station 14.

Figure 7:
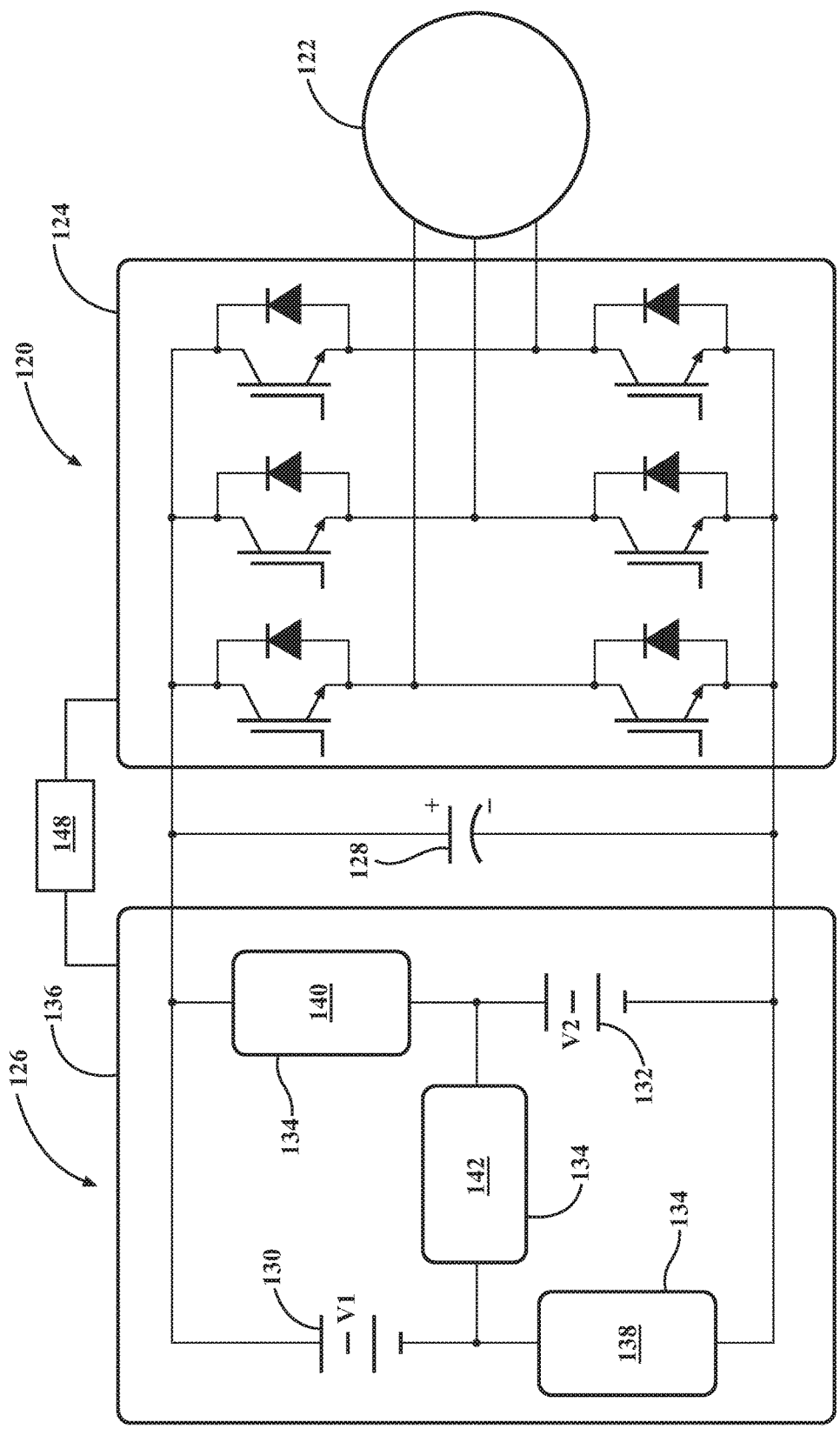
FIG. 7 is a schematic plan view of an electric powertrain.

Referring to FIG. 7, an electric powertrain is generally shown at 120. The electric powertrain 120 may be used to power a machine. For example, the electric powertrain 120 may be used to provide motive power for a vehicle, such as but not limited to a car, truck, ATV, train, plane, tractor, or some other form of moveable platform. However, it should be appreciated that the electric powertrain 120 may be used to power some other piece of machinery or equipment, other than a vehicle, not mentioned or described herein.

The electric powertrain 120 includes an electric machine 122, an inverter 124, and an energy storage system 126. The energy storage system 126 and the inverter 124 are arranged in a parallel electrical circuit with each other. The electric powertrain 120 may further include a capacitor 128, also disposed in the parallel electric circuit with the energy storage system 126 and the inverter 124. The energy storage system 126 is operable to provide a direct electric current to the inverter 124 and the capacitor 128. The inverter 124 converts the direct current to an alternating current, which is supplied to the electric machine 122. The electric machine 122 may include an electric device, such as but not limited to an electric motor. The exemplary embodiment of the electric powertrain 120 described herein includes the inverter 124 embodied as a three phase inverter 124, and the electric machine 122 embodied as a three phase alternating current motor. While the exemplary embodiment of the inverter 124 and the electric machine 122 are shown in FIG. 7 and described herein as being a three phase inverter and a three phase AC machine, it should be appreciated that the number of phases of the AC machine 122 and inverter 124 may vary from the exemplary three shown in FIG. 7 and described herein.

The energy storage system 126 includes a first energy storage device 130, a second energy storage device 132, and a plurality of low-loss switching devices 134. The first energy storage device 130, the second energy storage device 132, and the plurality of switching devices 134 are integrated into a single pack 136 or unit. The first energy storage device 130, the second energy storage device 132, and the plurality of switching devices 134 may be connected to each other within the pack 136, such that no extra leads or connections between the pack 136 and the electric machine 122 are required.

The first energy storage device 130 and the second energy storage device 132 may each include a rechargeable energy storage device as described above. The first energy storage device 130 and the second energy storage device 132 may each include a device that is rechargeable and capable of storing electrical energy, such as but not limited to ultra-capacitors, batteries, battery packs, battery cells, or a combination thereof. The specific type and construction of the first energy storage device 130 and the second energy storage device 132 are not pertinent to the teachings of this disclosure, and are therefore not described in detail herein.

The first energy storage device 130 is operable at a first device voltage V1. In other words, the first energy storage device 130 is operable to supply the electric current at the first device voltage V1. The second energy storage device 132 is operable at a second device voltage V2. In other words, the second energy storage device 132 is operable to supply the electric current at the second device voltage V2. In some embodiments, the first device voltage V1 and the second device voltage V2 may be substantially identical. For example, the first device voltage V1 and the second device voltage V2 may both be substantially and approximately equal to two hundred volts (200V). It should be appreciated that the first device voltage V1 and the second device voltage V2 may differ from the exemplary 200V described herein. In other embodiments, the first device voltage V1 and the second device voltage V2 may be substantially different. For example, the first device voltage V1 may be substantially and approximately equal to two hundred volts (200V), and the second device voltage V2 may be substantially and approximately equal to four hundred volts (400V).

The plurality of switching devices 134 interconnect the first energy storage device 130 and the second energy storage device 132, and are selectively controllable between a first operating mode and a second operating mode. In the exemplary embodiment shown in FIG. 7 and described herein, the plurality of switching devices 134 includes a first switching device 138, a second switching device 140, and a third switching device 142. It should be appreciated that other embodiments of the energy storage system 126 may include more energy storage devices than the exemplary two energy storage devices, and may include more switching devices 134 then the exemplary three switching devices 134.

The first switching device 138 is selectively controllable between an on-state and an off-state. The on-state of the first switching device 138 enables electrical communication through the first switching device 138. The off-state of the first switching device 138 prevents electrical communication through the first switching device 138. The second switching device 140 is selectively controllable between an on-state and an off-state. The on-state of the second switching device 140 enables electrical communication through the second switching device 140. The off-state of the second switching device 140 prevents electrical communication through the second switching device 140. Similarly, the third switching device 142 is selectively controllable between an on-state and an off-state. The on-state of the third switching device 142 enables electrical communication through the third switching device 142. The off-state of the third switching device 142 prevents electrical communication through the third switching device 142.

The first switching device 138, the second switching device 140, and the third switching device 142 are low-loss switching devices. As used herein, the term "low-loss switching device" means a solid state relay and/or an electromechanical relay. A solid state relay has no moving parts but instead uses the electrical and optical properties of solid state semiconductors to perform its input to output isolation and switching functions. As non-limiting examples, solid state relays include MOS-controlled Thyristors (MCTs), gallium-nitride (GaN) field-effect transistors (FETs), metal-oxide-semiconductor field-effect transistors (MOSFETs), silicon carbide junction field-effect transistors (SiC JFETs), insulated-gate bipolar transistors (IGBTs) or some other suitable low-loss device of suitable voltage and current ratings. The switching devices 134 may be electromechanical relays in parallel with solid state switches to further reduce the on-state conduction loses. During operation, the solid state switches carry the current during switching from on-to-off or off-to-on state of the electromechanical relay to eliminate arcing. The term "low-loss switching device" does not include strictly mechanical switches, because it is desirable to minimize the risk of the mechanical contacts from welding together and also minimize the delay ins witching from one voltage setting to another. The low-loss switching devices 134 are optimized for low voltage drop and eliminate arcing and minimize delay during switching. The switching devices 134 may include, but are not limited to, a bi-directional blocking switch 144, such as schematically shown in FIG. 8, or a uni-directional blocking switch 146, such as schematically shown in FIG. 9.

A controller 148 is connected to the electric powertrain 120, and controls the current operating state of each of the first switching device 138, the second switching device 140, and the third switching device 142, i.e., the on-state or the off-state of each respective switching device. As noted above, the energy storage system 126 may be configured to operate in at least a first operating mode or a second operating mode. When the plurality of switching devices 134 is controlled to operate in the first operating mode, the energy storage system 126 is operable to provide the electric current at a first system voltage. Accordingly, when the plurality of switching devices 134 is disposed in the first operating mode, the electric machine 122 operates at the first system voltage. When the plurality of switching devices 134 is controlled to operate in the second operating mode, the energy storage system 126 is operable to provide the electric current at a second system voltage. Accordingly, when the plurality of switching devices 134 is disposed in the second operating mode, the electric machine 122 operates at the second system voltage.

Figure 8:
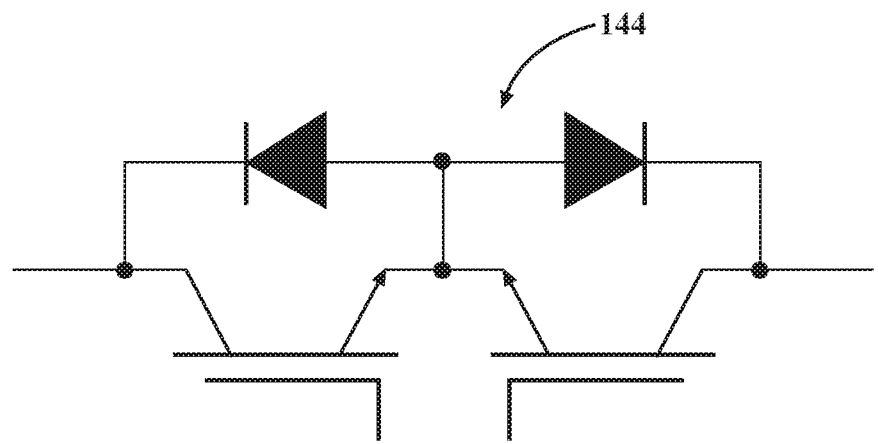
FIG. 8 is a schematic plan view of a first embodiment of a low-loss switch.
Figure 9:
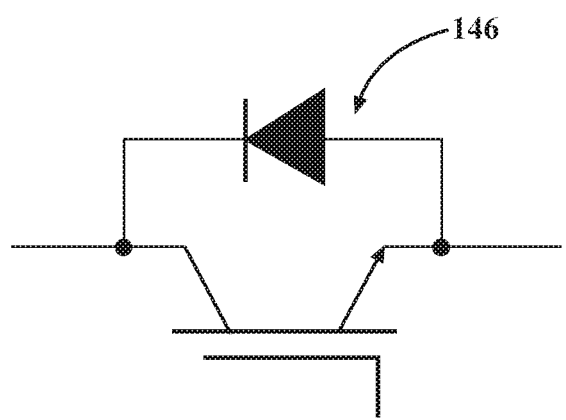
FIG. 9 is a schematic plan view of a second embodiment of the low-loss switch.

In a first exemplary embodiment of the energy storage system 126, the third switching device 142 includes a bi-directional blocking switch 144, such as shown in FIG. 8, and the first switching device 138 and the second switching device 140 each include a uni-directional blocking switch 146, such as shown in FIG. 9. In this configuration, the first device voltage V1 and the second device voltage V2 may be substantially identical. For example, the first device voltage V1 from the first energy storage device 130 and the second device voltage V2 from the second energy storage device 132 may each be substantially and approximately equal to 200V. However, it should be appreciated that the voltage may differ from the exemplary 200V described herein.

In the first embodiment of the energy storage system 126, in which the third switching device 142 includes a bi-directional blocking switch 144, and the first switching device 138 and the second switching device 140 each include a uni-directional blocking switch 146, when the plurality of switching devices 134 is controlled to operate in the first operating mode, the first switching device 138 and the second switching device 140 are each disposed in their respective on-state and the third switching device 142 is disposed in its respective off-state. The first operating mode of the first embodiment of the energy storage system 126 connects the first energy storage device 130 and the second energy storage device 132 in a parallel electric circuit. As noted above, the first device voltage V1 and the second device voltage V2 are substantially equal. As such, the first system voltage is substantially equal to the first device voltage V1 and the second device voltage V2, i.e., 200V in the exemplary embodiment In the first embodiment of the energy storage system 126, in which the third switching device 142 includes a bi-directional blocking switch 144, and the first switching device 138 and the second switching device 140 each include a uni-directional blocking switch 146, when the plurality of switching devices 134 is controlled to operate in the second operating mode, the first switching device 138 and the second switching device 140 are each disposed in their respective off-state and the third switching device 142 is disposed in its respective on-state. The second operating mode of the first embodiment of the energy storage system 126 connects the first energy storage device 130 and the second energy storage device 132 in a series electric circuit. As such, the second system voltage is substantially equal to the sum of the first device voltage V1 and the second device voltage V2. Accordingly, in the exemplary embodiment described herein, the second system voltage would be equal to 400V (i.e., 200V plus 200V).

In a second exemplary embodiment of the energy storage system 126, the first switching device 138, the second switching device 140, and the third switching device 142 each include a bi-directional blocking switch 144, such as shown in FIG. 8. In this configuration, the first device voltage V1 and the second device voltage V2 may be substantially different. For example, the first device voltage V1 from the first energy storage device 130 may be substantially and approximately equal to 200V, and the second device voltage V2 from the second energy storage device 132 may be substantially and approximately equal to 400V. However, it should be appreciated that the first device voltage V1 and the second device voltage V2 may differ from the exemplary values described herein.

In the second embodiment of the energy storage system 126, in which the first switching device 138, the second switching device 140, and the third switching device 142 each include a bi-directional blocking switch 144, when the plurality of switching devices 134 is controlled to operate in the first operating mode, the first switching device 138 is disposed in its respective on-state and the second switching device 140 and the third switching device 142 are each disposed in their respective off state. The first operating mode of the second embodiment of the energy storage system 126 isolates the second energy storage device 132, such that the first energy storage device 130 supplies the electric current at the first system voltage to the inverter 124. The first system voltage is then substantially equal to the first device voltage V1, i.e., 200V in the exemplary embodiment.

In the second embodiment of the energy storage system 126, in which the first switching device 138, the second switching device 140, and the third switching device 142 each include a bi-directional blocking switch 144, when the plurality of switching devices 134 is controlled to operate in the second operating mode, the second switching device 140 is disposed in its respective on-state and the first switching device 138 and the third switching device 142 are each disposed in their respective off state. The second operating mode of the second embodiment of the energy storage system 126 isolates the first energy storage device 130, such that the second energy storage device 132 supplies the electric current at the second system voltage to the inverter 124. The second system voltage is then substantially equal to the second device voltage V2, i.e., 400V in the exemplary embodiment.

The second embodiment of the energy storage system 126, in which the first switching device 138, the second switching device 140, and the third switching device 142 each include a bi-directional blocking switch 144, may also be controlled to operate in a third operating mode. When the plurality of switching devices 134 is selectively controllable to operate in the third operating mode, the energy storage system 126 is operable to provide the electric current at a third system voltage. When the plurality of switches are controlled to operate in the third operating mode, the third switching device 142 is disposed in its respective on-state and the first switching device 138 and the second switching device 140 are each disposed in their respective off-state. The third operating mode of the second embodiment of the energy storage system 126 connects the first energy storage device 130 and the second energy storage device 132 in a series electric circuit to provide the electric current at the third system voltage. As such, the third system voltage is substantially equal to the sum of the first device voltage V1 and the second device voltage V2. Accordingly, in the exemplary embodiment described herein, the third system voltage would be equal to 600V (i.e., 200V plus 400V).

As noted above, the controller 148 is operable to control the current operating state of the plurality of switches. The controller 148 may be referred to as a control unit, a control module, a computer, or some variation thereof. The controller 148 may include a computer and/or processor, and include all software, hardware, memory, algorithms, connections, sensors, etc., for managing and controlling the operation of the electric powertrain 120. As such, a method, described below, may be embodied as a program or algorithm operable on the controller 148. It should be appreciated that the controller 148 may include a device capable of analyzing data from various sensors, comparing data, making the decisions required to control the operation of the electric powertrain 120 and executing the required tasks for controlling the operation of the electric powertrain 120, including changing the operating state of the respective switching devices 134.

The controller 148 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include a non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or other optical medium, as well as other possible memory devices such as flash memory.

The controller 148 includes tangible, non-transitory memory on which are recorded computer-executable instructions, including a powertrain control algorithm. The processor of the controller 148 is configured for executing the powertrain control algorithm. The powertrain control algorithm implements a method of controlling the electric powertrain 120 described above.

The method of controlling the electric powertrain 120 includes providing the energy storage system 126. As described above, the energy storage system 126 includes the first energy storage device 130 that is operable at the first device voltage V1, and the second energy storage device 132 that is operable at the second device voltage V2. The energy storage system 126 is further provided to include the plurality of switching devices 134, i.e., the first switching device 138, the second switching device 140, and the third switching device 142. The plurality of switching devices 134 may be provided as described above with the first embodiment of the energy storage system 126, or may be provided as described above with the second embodiment of the energy storage system 126.

Figure 10:
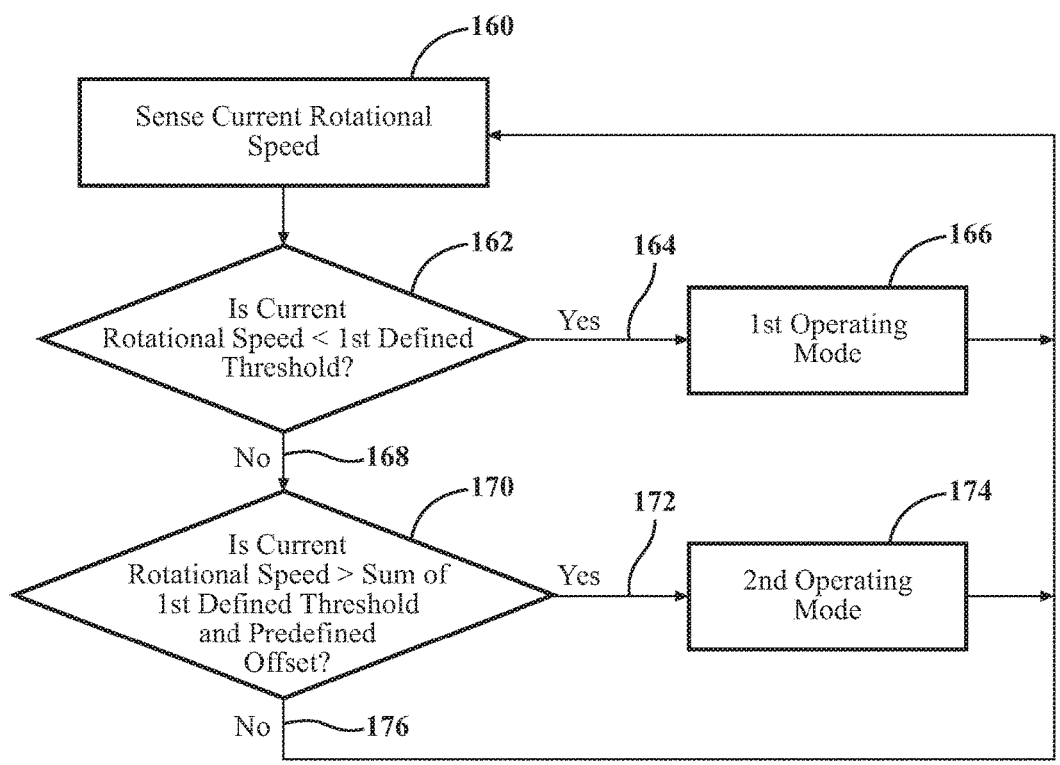
FIG. 10 is a flowchart representing a method of controlling the electric powertrain having a first embodiment of an energy storage device.

Referring to FIG. 10 for the first embodiment of the energy storage system 126, the controller 148 senses a current rotational speed of the electric machine 122. The step of sensing the current rotational speed of the electric machine is generally indicated by box 160 in FIG. 10. The controller 148 may sense the rotational speed of the electric machine 122 in a suitable manner, such as with a rotational speed sensor or some other similar device. The controller 148 then compares the current rotational speed of the electric machine 122 to a first defined threshold, to determine if the current rotational speed of the electric machine 122 is less than the first defined threshold. The step of determining if the current rotational speed of the electric machine 122 is less than the first defined threshold is generally indicated by box 162 in FIG. 10.

When the controller 148 determines that the current rotational speed of the electric machine 122 is less than the first defined threshold, generally indicated at 164 in FIG. 10, then the vehicle controller 148 controls the first switching device 138, the second switching device 140, and the third switching device 142 to operate in the first operating mode, generally indicated by box 166 in FIG. 10. When the first switching device 138, the second switching device 140, and the third switching device 142 are controlled to operate in the first operating mode, the energy storage system 126 provides the electric current at the first system voltage.

When the controller 148 determines that the current rotational speed of the electric machine 122 is not less than the first defined threshold, i.e., that the current rotational speed of the electric machine is greater than the first defined threshold, generally indicated at 168 in FIG. 10, then the vehicle controller 148 compares the current rotational speed of the electric machine 122 to a sum of first defined threshold and the pre-defined offset, to determine if the sum of the current rotational speed of the electric machine 122 is greater than the sum of the first defined threshold and the pre-defined offset, or if the current rotational speed of the electric machine 122 is equal to or less than the sum of the first defined threshold and the predefined offset. The pre-defined offset may include a small value, such as a hysteresis delta, to prevent chattering between the first operating mode and the second operating mode when the current rotational speed of the electric machine 122 is varying just around the first pre-defined threshold. The step of determining if the current rotational speed of the electric machine 122 is greater than the sum of the first defined threshold and the pre-defined offset is generally indicated by box 170 in FIG. 10.

When the controller 148 determines that the current rotational speed of the electric machine 122 is greater than the sum of the first defined threshold and the pre-defined offset, generally indicated at 172 in FIG. 10, then the vehicle controller 148 controls the first switching device 138, the second switching device 140, and the third switching device 142 to operate in the second operating mode, generally indicated by box 174 in FIG. 10. When the first switching device 138, the second switching device 140, and the third switching device 142 are controlled to operate in the second operating mode, the energy storage system 126 provides the electric current at the second system voltage.

When the controller 148 determines that the current rotational speed of the electric machine 122 is not greater than the sum of the first defined threshold and the pre-defined offset, generally indicated at 176 in FIG. 10, then the vehicle controller 148 continues to sense the current rotational speed of the electric machine 122, and repeats the process, until the sensed current rotational speed of the electric machine 122 is either less than the first defined threshold, or greater than the sum of the first defined threshold and the predefined offset.

The manner in which the controller 148 controls the plurality of switching devices 134 depends upon the specific embodiment of the energy storage system 126. For example, when the energy storage system 126 includes the first embodiment of the energy storage system 126 described above, in which the first switching device 138 and the second switching device 140 are each uni-directional blocking switches 146 and the third switching device 142 is a bi-directional blocking switch 144, then controlling the first switching device 138, the second switching device 140, and the third switching device 142 to operate in the first operating mode includes controlling the first switching device 138 and the second switching device 140 into their respective on-state and the third switching device 142 into its respective off-state. Controlling the first embodiment of the energy storage system 126 into the first operating mode connects the first energy storage device 130 and the second energy storage device 132 in a parallel electric circuit, such that the first system voltage is substantially equal to the first device voltage V1 and the second device voltage V2, thereby providing a lower system voltage.

When the energy storage system 126 includes the first embodiment of the energy storage system 126 described above, in which the first switching device 138 and the second switching device 140 are each uni-directional blocking switches 146 and the third switching device 142 is a bi-directional blocking switch 144, then controlling the first switching device 138, the second switching device 140, and the third switching device 142 to operate in the second operating mode includes controlling the first switching device 138 and the second switching device 140 into their respective off-state and the third switching device 142 into its respective on-state. Controlling the first embodiment of the energy storage system 126 into the second operating mode connects the first energy storage device 130 and the second energy storage device 132 in a series electric circuit, such that the second system voltage is substantially equal to the sum of the first device voltage V1 and the second device voltage V2, thereby providing a higher system voltage.

Accordingly, with the first embodiment of the energy storage system 126, in which the first switching device 138 and the second switching device 140 are each uni-directional blocking switches 146 and the third switching device 142 is a bi-directional blocking switch 144, the controller 148 controls the switching devices 134 to operate in the first operating mode at lower rotational speeds of the electric machine 122 to minimize energy losses. The controller 148 controls the switching devices 134 to operate in the second operating mode at higher rotational speeds of the electric machine 122 to enable the electric machine 122 to generate more torque over a wider range of rotational speeds.

Figure 11:
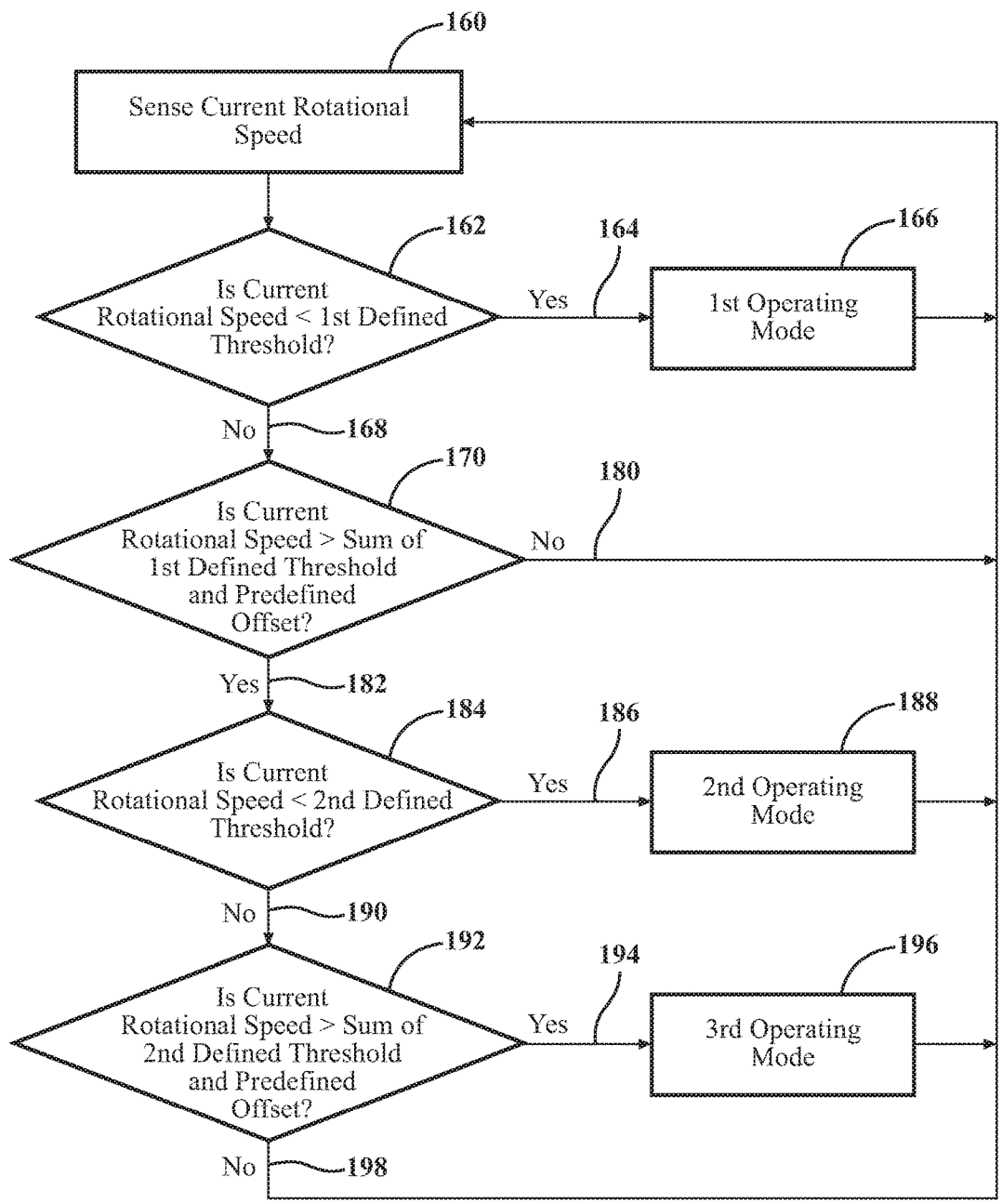
FIG. 11 is a flowchart representing the method of controlling the electric powertrain having a second embodiment of the energy storage device.

As described above, the second embodiment of the energy storage system 126 may be controlled to operate in the third operating mode. Referring to FIG. 11 for the second embodiment of the energy storage system 126, the controller 148 senses a current rotational speed of the electric machine 122. The step of sensing the current rotational speed of the electric machine is generally indicated by box 160 in FIG. 11. The controller 148 may sense the rotational speed of the electric machine 122 in a suitable manner, such as with a rotational speed sensor or some other similar device. The controller 148 then compares the current rotational speed of the electric machine 122 to the first defined threshold, to determine if the current rotational speed of the electric machine 122 is less than the first defined threshold, or if the current rotational speed of the electric machine 122 is greater than the first defined threshold by a predefined offset (e.g., a hysteresis level). The step of determining if the current rotational speed of the electric machine 122 is less than the first defined threshold is generally indicated by box 162 in FIG. 11.

When the controller 148 determines that the current rotational speed of the electric machine 122 is less than the first defined threshold, generally indicated at 164 in FIG. 11, then the vehicle controller 148 controls the first switching device 138, the second switching device 140, and the third switching device 142 to operate in the first operating mode, generally indicated by box 166 in FIG. 11. When the first switching device 138, the second switching device 140, and the third switching device 142 are controlled to operate in the first operating mode, the energy storage system 126 provides the electric current at the first system voltage.

When the controller 148 determines that the current rotational speed of the electric machine 122 is not less than the first defined threshold, i.e., that the current rotational speed of the electric machine is greater than the first defined threshold, generally indicated at 168 in FIG. 11, then the vehicle controller 148 compares the current rotational speed of the electric machine 122 to the sum of first defined threshold and the pre-defined offset, to determine if the sum of the current rotational speed of the electric machine 122 is greater than the sum of the first defined threshold and the pre-defined offset, or if the current rotational speed of the electric machine 122 is equal to or less than the sum of the first defined threshold and the predefined offset. The step of determining if the current rotational speed of the electric machine 122 is greater than the sum of the first defined threshold and the pre-defined offset is generally indicated by box 170 in FIG. 10.

When the controller 148 determines that the current rotational speed of the electric machine 122 is not greater than the sum of the first defined threshold and the pre-defined offset, generally indicated at 180 in FIG. 11, then the vehicle controller 148 continues to sense the current rotational speed of the electric machine 122, and repeats the process, until the sensed current rotational speed of the electric machine 122 is either less than the first defined threshold, or greater than the sum of the first defined threshold and the predefined offset.

When the controller 148 determines that the current rotational speed of the electric machine 122 is greater than the sum of the first defined threshold and the pre-defined offset, generally indicated at 182 in FIG. 11, then the controller 148 compares the current rotational speed of the electric machine 122 to a second defined threshold, to determine if the current rotational speed of the electric machine 122 is less than the second defined threshold, or if the current rotational speed of the electric machine 122 is greater than the second defined threshold by the predefined offset. The step of determining if the current rotational speed of the electric machine 122 is less than the second defined threshold is generally indicated by box 184 in FIG. 11.

When the controller 148 determines that the current rotational speed of the electric machine 122 is less than the second defined threshold, generally indicated at 186 in FIG. 11, then the vehicle controller 148 controls the first switching device 138, the second switching device 140, and the third switching device 142 to operate in the second operating mode, generally indicated by box 188 in FIG. 11. When the first switching device 138, the second switching device 140, and the third switching device 142 are controlled to operate in the second operating mode, the energy storage system 126 provides the electric current at the second system voltage.

When the controller 148 determines that the current rotational speed of the electric machine 122 is not less than the second defined threshold, i.e., that the current rotational speed of the electric machine is greater than the second defined threshold, generally indicated at 190 in FIG. 11, then the vehicle controller 148 compares the current rotational speed of the electric machine 122 to a sum of second defined threshold and the pre-defined offset, to determine if the current rotational speed of the electric machine 122 is greater than the sum of the second defined threshold and the pre-defined offset, or if the current rotational speed of the electric machine 122 is equal to or less than the sum of the second defined threshold and the predefined offset. The step of determining if the current rotational speed of the electric machine 122 is greater than the sum of the second defined threshold and the pre-defined offset is generally indicated by box 192 in FIG. 11.

When the controller 148 determines that the current rotational speed of the electric machine 122 is greater than the sum of the second defined threshold and the pre-defined offset, generally indicated at 194 in FIG. 11, then the vehicle controller 148 controls the first switching device 138, the second switching device 140, and the third switching device 142 to operate in the third operating mode, generally indicated by box 196 in FIG. 11. When the first switching device 138, the second switching device 140, and the third switching device 142 are controlled to operate in the third operating mode, the energy storage system 126 provides the electric current at the third system voltage.

When the controller 148 determines that the current rotational speed of the electric machine 122 is not greater than the sum of the second defined threshold and the pre-defined offset, generally indicated at 198 in FIG. 11, then the vehicle controller 148 continues to sense the current rotational speed of the electric machine 122, and repeats the process.

When the energy storage system 126 includes the second embodiment of the energy storage system 126 described above, in which the first switching device 138, the second switching device 140, and the third switching device 142 each include a bi-directional blocking switch 144, then controlling the first switching device 138, the second switching device 140, and the third switching device 142 to operate in the first operating mode includes controlling the first switching device 138 into its respective on-state and the second switching device 140 and the third switching device 142 into their respective off-state to isolate the second energy storage device 132, such that the first energy storage device 130 supplies the electric current at the first system voltage, with the first system voltage being substantially equal to the first device voltage V1, thereby providing a lower system voltage.

When the energy storage system 126 includes the second embodiment of the energy storage system 126 described above, in which the first switching device 138, the second switching device 140, and the third switching device 142 each include a bi-directional blocking switch 144, then controlling the first switching device 138, the second switching device 140, and the third switching device 142 to operate in the second operating mode includes controlling the second switching device 140 into its respective on-state and the first switching device 138 and the third switching device 142 into their respective off-state to isolate the first energy storage device 130, such that the second energy storage device 132 supplies the electric current at the second system voltage, with the second system voltage being substantially equal to the second device voltage V2. This provides an intermediate system voltage.

When the energy storage system 126 includes the second embodiment of the energy storage system 126 described above, in which the first switching device 138, the second switching device 140, and the third switching device 142 each include a bi-directional blocking switch 144, then controlling the first switching device 138, the second switching device 140, and the third switching device 142 to operate in the third operating mode includes controlling the third switching device 142 into its respective on-state and the first switching device 138 and the second switching device 140 into their respective off-state to connect the first energy storage device 130 and the second energy storage device 132 in a series electric circuit to provide the electric current at the third system voltage. The third system voltage is substantially equal to the sum of the first device voltage V1 and the second device voltage V2, thereby providing a higher system voltage.

Accordingly, with the second embodiment of the energy storage system 126, in which the first switching device 138, the second switching device 140, and the third switching device 142 each include a bi-directional blocking switch 144, the controller 148 controls the switching devices 134 to operate in the first operating mode at lower rotational speeds of the electric machine 122 to minimize energy losses. The controller 148 controls the switching devices 134 to operate in the second operating mode at intermediate rotational speeds of the electric machine 122 to enable the electric machine 122 to generate more torque over a wider range of rotational speeds. The controller 148 controls the switching devices 134 to operate in the third operating mode at high rotational speeds of the electric machine 122 to further increase the torque generation at higher rotational speeds of the electric machine 122.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. An electric powertrain comprising:
   an electric machine;
   an inverter connected to the electric machine;
   an energy storage system connected to the inverter for supplying an electric current to the inverter, the energy storage system including:
      a first energy storage device operable at a first device voltage;
      a second energy storage device operable at a second device voltage;
      a plurality of switching devices interconnecting the first energy storage device and the second energy storage device, and selectively controllable between a first operating mode, a second operating mode and a third operating mode;
   wherein the energy storage system is operable to provide the electric current at a first system voltage when the plurality of switching devices are controlled to operate in the first operating mode while the electric machine is operating at a first rotational speed that is less than a first defined threshold;
   wherein the energy storage system is operable to provide the electric current at a second system voltage when the plurality of switching devices are controlled to operate in the second operating mode while the electric machine is operating at a second rotational speed that is greater than the first defined threshold, with the first system voltage being different from the second system voltage; and
   wherein the energy storage system is operable to provide the electric current at a third system voltage when the plurality of switching devices are controlled to operate in the third operating mode while the electric machine is operating at a third rotational speed that is greater than a second defined threshold, with the third system voltage being different from the first system voltage and the second system voltage.

2. The electric powertrain set forth in claim 1, wherein the plurality of switching devices includes:
   a first switching device selectively controllable between an on-state enabling electrical communication therethrough, and an off-state preventing electrical communication therethrough;
   a second switching device selectively controllable between an on-state enabling electrical communication therethrough, and an off-state preventing electrical communication therethrough; and
   a third switching device selectively controllable between an on-state enabling electrical communication therethrough, and an off-state preventing electrical communication therethrough.

3. The electric powertrain set forth in claim 2, wherein the third switching device includes a bi-directional blocking switch.

4. The electric powertrain set forth in claim 2, wherein the first switching device and the second switching device each include a uni-directional blocking switch.

5. The electric powertrain set forth in claim 2, wherein the first switching device and the second switching device each include a bi-directional blocking switch.

6. The electric powertrain set forth in claim 2, wherein the first switching device is disposed in the respective on-state and the second switching device and the third switching device are each disposed in the respective off state, when the plurality of switching devices are controlled to operate in the first operating mode, to isolate the second energy storage device such that only the first energy storage device supplies the electric current at the first system voltage to the inverter, with the first system voltage being substantially equal to the first device voltage.

7. The electric powertrain set forth in claim 2, wherein the second switching device is disposed in the respective on-state and the first switching device and the third switching device are each disposed in the respective off state, when the plurality of switching devices are controlled to operate in the second operating mode, to isolate the first energy storage device such that only the second energy storage device supplies the electric current at the second system voltage to the inverter, with the second system voltage being substantially equal to the second device voltage.

8. The electric powertrain set forth in claim 2, wherein the third switching device is disposed in the respective on-state and the first switching device and the second switching device are each disposed in the respective off-state, when the plurality of switching devices are controlled to operate in the third operating mode, to connect the first energy storage device and the second energy storage device in a series electric circuit to provide the electric current at the third system voltage, with the third system voltage being substantially equal to a sum of the first device voltage and the second device voltage.

9. The electric powertrain set forth in claim 1, wherein the electric machine is a three phase alternating current motor, and the inverter is a three phase inverter.

10. The electric powertrain set forth in claim 1, further comprising a capacitor disposed in a parallel electric circuit with the energy storage system and with the inverter.

11. The electric powertrain set forth in claim 1, wherein the first energy storage device, the second energy storage device, and the plurality of switching devices are integrated into a single pack.

12. The electric powertrain set forth in claim 1, wherein:
controlling the first switching device, the second switching device, and the third switching device to operate in the first operating mode includes controlling the first switching device into the respective on-state and each of the second switching the device and the third switching device into the respective off-state to isolate the second energy storage device such that only the first energy storage device supplies the electric current at the first system voltage, with the first system voltage being substantially equal to the first device voltage; and
controlling the first switching device, the second switching device, and the third switching device to operate in the second operating mode includes controlling the second switching device into the respective on-state and each of the first switching device and the third switching device into the respective off-state to isolate the first energy storage device such that only the second energy storage device supplies the electric current at the second system voltage, with the second system voltage being substantially equal to the second device voltage.

13. The electric powertrain set forth in claim 12, wherein the first switching device, the second switching device, and the third switching device are each a bi-directional blocking switch.

14. An electric powertrain comprising:
an energy storage system for supplying an electric current, the energy storage system including:
a first energy storage device operable at a first device voltage;
a second energy storage device operable at a second device voltage;
a first switching device selectively controllable between an on-state enabling electrical communication therethrough, and an off-state preventing electrical communication therethrough;
a second switching device selectively controllable between an on-state enabling electrical communication therethrough, and an off-state preventing electrical communication therethrough; and
a third switching device selectively controllable between an on-state enabling electrical communication therethrough, and an off-state preventing electrical communication therethrough;
wherein the first switching device, the second switching device, and the third switching device are selectively controllable to provide the electric current at a first system voltage when the first switching device, the second switching device, and the third switching device are controlled to operate in a first operating mode while the electric machine is operating at a first rotational speed that is less than a first defined threshold;
wherein the first switching device, the second switching device, and the third switching device are selectively controllable to provide the electric current at a second system voltage when the first switching device, the second switching device, and the third switching device are controlled to operate in a second operating mode while the electric machine is operating at a second rotational speed that is greater than the first defined threshold, with the first system voltage being different from the second system voltage; and
wherein the first switching device, the second switching device, and the third switching device are selectively controllable to provide the electric current at a third system voltage when the first switching device, the second switching device, and the third switching device are controlled to operate in a third operating mode while the electric machine is operating at a third rotational speed that is greater than a second defined threshold, with the third system voltage being different from the first system voltage and the second system voltage.

15. The electric powertrain set forth in claim 14, wherein:
controlling the first switching device, the second switching device, and the third switching device to operate in the first operating mode includes controlling the first switching device into the respective on-state and each of the second switching the device and the third switching device into the respective off-state to isolate the second energy storage device such that only the first energy storage device supplies the electric current at the first system voltage, with the first system voltage being substantially equal to the first device voltage;

controlling the first switching device, the second switching device, and the third switching device to operate in the second operating mode includes controlling the second switching device into the respective on-state and each of the first switching device and the third switching device into the respective off-state to isolate the first energy storage device such that only the second energy storage device supplies the electric current at the second system voltage, with the second system voltage being substantially equal to the second device voltage; and wherein the first switching device, the second switching device, and the third switching device are each a bi-directional blocking switch.

16. A method of controlling an electric powertrain including an electric machine, an inverter connected to the electric machine, and an energy storage system connected to the inverter, the method comprising:

providing the energy storage system to include:
  a first energy storage device operable at a first device voltage;
  a second energy storage device operable at a second device voltage;
  a first switching device selectively controllable between an on-state enabling electrical communication therethrough, and an off-state preventing electrical communication therethrough;
  a second switching device selectively controllable between an on-state enabling electrical communication therethrough, and an off-state preventing electrical communication therethrough; and
  a third switching device selectively controllable between an on-state enabling electrical communication therethrough, and an off-state preventing electrical communication therethrough;

controlling the first switching device, the second switching device, and the third switching device to operate in a first operating mode to provide an electric current at a first system voltage while the electric machine is operating at a first rotational speed that is less than a first defined threshold;

controlling the first switching device, the second switching device, and the third switching device to operate in a second operating mode to provide the electric current at a second system voltage while the electric machine is operating at a second rotational speed that is greater than the first defined threshold, with the first system voltage being different from the second system voltage; and controlling the first switching device, the second switching device, and the third switching device to operate in a third operating mode to provide the electric current at a third system voltage while the electric machine is operating at a third rotational speed that is greater than a second defined threshold, with the third system voltage being different from the first system voltage and the second system voltage.

17. The method set forth in claim 16, wherein controlling the first switching device, the second switching device, and the third switching device to operate in the first operating mode includes controlling the first switching device into the respective on-state and each of the second switching device and the third switching device into the respective off-state to isolate the second energy device such that only the first energy storage device supplies the electric current at the first system voltage, with the first system voltage being substantially equal to the first device voltage.

18. The method set forth in claim 17, wherein controlling the first switching device, the second switching device, and the third switching device to operate in the second operating mode includes controlling the second switching device into the respective on-state and each of the first switching device and the third switching device into the respective off-state to isolate the first energy storage device such that only the second energy storage device supplies the electric current at the second system voltage, with the second system voltage being substantially equal to the second device voltage.

19. The method set forth in claim 18, wherein controlling the first switching device, the second switching device, and the third switching device to operate in the third operating mode includes controlling the third switching device into the respective on-state and each of the first switching device and the second switching device into the respective off-state to connect the first energy storage device and the second energy storage device in a series electric circuit to provide the electric current at the third system voltage, with the third system voltage being substantially equal to a sum of the first device voltage and the second device voltage.

20. The method set forth in claim 18, wherein the first switching device, the second switching device, and the third switching device are each a bi-directional blocking switch.

* * * * *